United States Patent
Li

(10) Patent No.: US 8,446,337 B2
(45) Date of Patent: May 21, 2013

(54) METHOD FOR OPERATING OBJECT BETWEEN TERMINALS AND TERMINAL USING THE METHOD

(75) Inventor: Zhongqing Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 826 days.

(21) Appl. No.: 12/178,403

(22) Filed: Jul. 23, 2008

(65) Prior Publication Data

US 2009/0027302 A1  Jan. 29, 2009

(30) Foreign Application Priority Data

Jul. 25, 2007  (CN) .......................... 2007 1 0119478

(51) Int. Cl.
*G09G 5/00* (2006.01)

(52) U.S. Cl.
USPC ............... 345/1.1; 345/1.2; 345/1.3; 345/2.1; 345/2.2; 345/2.3

(58) Field of Classification Search
USPC ............. 345/1.1–2.1, 98, 156–158, 522, 531, 345/632, 751, 107, 428, 520, 619, 659, 9, 345/581; 709/223, 224, 205; 455/426.1; 725/43, 725/37; 348/79; 715/733, 753
See application file for complete search history.

(56) References Cited

U.S. PATENT DOCUMENTS

| | | | | |
|---|---|---|---|---|
| 4,769,698 A * | 9/1988 | Ledley et al. | .................... | 348/79 |
| 5,796,401 A * | 8/1998 | Winer | ........................... | 345/619 |
| 6,111,588 A * | 8/2000 | Newell | ........................... | 345/442 |
| 6,191,807 B1 * | 2/2001 | Hamada et al. | ............ | 348/14.07 |
| 6,198,170 B1 * | 3/2001 | Zhao | ............................ | 257/784 |
| 6,373,500 B1 * | 4/2002 | Daniels | ......................... | 345/632 |
| 6,469,690 B1 * | 10/2002 | Abraham et al. | ............. | 345/156 |
| 6,807,562 B1 * | 10/2004 | Pennock et al. | .............. | 709/204 |
| 6,822,643 B2 * | 11/2004 | Matsui et al. | .................. | 345/204 |
| 6,839,061 B1 * | 1/2005 | Kamakura et al. | ............ | 345/520 |
| 7,024,456 B1 * | 4/2006 | Simonoff | ....................... | 709/205 |
| 7,120,433 B2 * | 10/2006 | Gladwin et al. | ............ | 455/426.1 |
| 7,460,108 B2 * | 12/2008 | Tamura | .......................... | 345/169 |
| 7,518,589 B2 * | 4/2009 | Takeda | ............................ | 345/98 |
| 7,864,158 B1 * | 1/2011 | McGeever | ...................... | 345/158 |
| 7,911,446 B2 * | 3/2011 | Olsen et al. | ..................... | 345/157 |
| 2001/0050658 A1 * | 12/2001 | Adams | ................................ | 345/4 |
| 2002/0060648 A1 * | 5/2002 | Matsui et al. | ..................... | 345/8 |
| 2002/0080171 A1 * | 6/2002 | Laferriere et al. | .............. | 345/751 |
| 2002/0167460 A1 * | 11/2002 | Baudisch et al. | .............. | 345/3.3 |

(Continued)

FOREIGN PATENT DOCUMENTS

| | | |
|---|---|---|
| CN | 1543598 | 11/2004 |
| CN | 1734414 | 2/2006 |
| CN | 1849578 | 10/2006 |

OTHER PUBLICATIONS

Synergy Technology, http://synergy2.sourceforge.net.

*Primary Examiner* — Prabodh M Dharia

(74) *Attorney, Agent, or Firm* — Dickstein Shapiro LLP

(57) ABSTRACT

A method for operating an object between a first terminal and a second terminal. The display space of one of the first and second terminals is extended to the other terminal. One of the first and second terminals intercepts an event associated with the object occurring in the terminal so as to obtain the position of the object, informs the other terminal of the position of the object, and redraws the object on the screen of the other terminal based on the received position.

10 Claims, 7 Drawing Sheets

U.S. PATENT DOCUMENTS

| | | | |
|---|---|---|---|
| 2002/0180757 A1* | 12/2002 | Duerr et al. | 345/620 |
| 2004/0158494 A1* | 8/2004 | Suthar | 705/15 |
| 2004/0226041 A1* | 11/2004 | Smith et al. | 725/43 |
| 2005/0036509 A1* | 2/2005 | Acharya et al. | 370/466 |
| 2005/0140574 A1* | 6/2005 | Tamura | 345/9 |
| 2005/0193143 A1* | 9/2005 | Meyers et al. | 709/238 |
| 2006/0015598 A1* | 1/2006 | Olsen et al. | 709/223 |
| 2006/0109274 A1* | 5/2006 | Alvarez et al. | 345/473 |
| 2006/0136828 A1* | 6/2006 | Asano | 715/733 |
| 2006/0236250 A1* | 10/2006 | Gargi | 715/753 |
| 2007/0132768 A1* | 6/2007 | Podnar et al. | 345/520 |
| 2007/0165044 A1* | 7/2007 | Wells et al. | 345/581 |
| 2007/0279315 A1* | 12/2007 | Laves et al. | 345/1.1 |
| 2007/0282687 A1* | 12/2007 | Laves | 705/14 |
| 2010/0064245 A1* | 3/2010 | Smith et al. | 715/778 |
| 2011/0096081 A1* | 4/2011 | Smith et al. | 345/522 |

\* cited by examiner

METHOD FOR OPERATING OBJECT BETWEEN TERMINALS AND TERMINAL USING THE METHOD

BACKGROUND OF THE INVENTION

1. Field of Invention

The present invention relates to mutual display extension, cooperation and sharing among a plurality of terminals, in particular to a method for operating an object, such as a cursor, between two terminals as well as a terminal using the method, which can improve the efficiency of cooperation between two terminals spaced by a viewing distance.

2. Description of the Related Prior Art

Currently, to share information, two computers may extend their display parts mutually while cooperating with each other, especially when the two computers cooperate in computation within a viewing distance. In some of the existing solutions, a remote control method is adopted for the two computers, where one of the two computers performs control and desktop sharing on the screen of the other. Since the desktop of the latter is under a complete control and thus cannot implement any other task, the efficiency is severely reduced. Besides, the same screen content is displayed on both of the computers, resulting in a 50% discount of display efficiency. Although it is provided for a remote control mechanism, the above method can be applied to the control between two computers spaced by a viewing distance. The disadvantages are apparent, that is, only one party can operate at any moment, and only the desktop of the controlled party can be viewed.

Patent document 1(CN200510099693.5) provides a method in which two host computers output display content to one display simultaneously, and then the keyboard/mouse inputs of the both parties are coordinated in a communicative manner. In this method, two personal computers (PC) are connected to a monitor and to input devices, such as keyboard, mouse. Video signals supplied from the PCs are written, via buffers respectively, to a memory for video signals corresponding to multiple pictures. This method requires an additional display, a corresponding memory and a communication device dedicated to coordination of keyboard/mouse inputs. Thus, the method is high in cost and inconvenient in use.

Patent document 2(CN01812134.9) employs a time division method, which uses a set of keyboard-mouse input devices to output keyboard-mouse signals to two computer systems, in order to improve the efficiency of information delivery between the systems. In this method, there is only one keyboard-mouse operating system, which cannot be manipulated simultaneously by two parties. Further, the two computer systems cannot be controlled at the same time, since the method is a time division one, that is, one period is for communication mode where operation is made on the second terminal, and the other period is for non-communication mode where operation is made on only the host computer. Apparently, such method has no contribution to the increase in the efficiency of cooperative computation.

Patent document 3(SYNERGY TECHNOLOGY, http://synergy2.sourceforge.net/) allows computers having different operating systems to share a single mouse and a single keyboard and thus facilitates the user operating on several computers. This method adopts a trans-platform fashion and set a master-slave relationship. In this way, the cursor of the single mouse can be shared by these computers and returned to the master computer through a hotkey when it roams onto the other computers. This method also has obvious drawbacks, that is, when operating with SYNERGY technique, the other computers can be controlled by only the keyboard and the mouse of the master computer, thereby inhibiting the cooperation of and multiple computers by multiple persons.

SUMMARY OF THE INVENTION

The present invention is made to address the above problems. The object of the present invention is to provide a method for operating an object among a plurality of terminals and a terminal thereof, which can uplift the efficiency of cooperation of the plurality of terminals.

In an aspect of the present invention, there is provided a method of operating an object between a first terminal and a second terminal, the method comprising: extending the display space of the first terminal to the second terminal; obtaining an event associated with the object, and obtaining the position information of the object according to the event; informing the second terminal the position information; wherein the second terminal redraws the object on the screen of the second terminal according to the position information.

According to a preferred embodiment of the present application, the method further comprises: sending data to the second terminal; wherein the data is displayed on the second terminal.

According to a preferred embodiment of the present invention, the extending comprises mapping the coordinate system to the second terminal in an arbitrary direction.

According to a preferred embodiment of the present invention, the step of extending the display space of one of the first and second terminals to the other terminal comprises mapping the coordinate system of the one of the first and second terminals to the coordinate system of the other terminal in an arbitrary direction.

According to a preferred embodiment of the present invention, within a single window, a first portion to be displayed on the first terminal and a second portion to be displayed on the second terminal are distinguished from each other according to the coordinate system, the first portion is handled by the first terminal, and the second portion is handled by the second terminal.

According to a preferred embodiment of the present invention, the display modes/mode of the first terminal and/or the second terminal are/is converted so that the display modes of the first and second terminals are identical.

According to a preferred embodiment of the present invention, the step of redrawing the object comprises placing information on the object in a display memory of the other terminal through GDI or DIRECTX.

According to a preferred embodiment of the present invention, the first and second terminals are connected by the network and transmit data over the network.

According to a preferred embodiment of the present invention, the network comprises a wired network and a wireless network.

According to a preferred embodiment of the present invention, the object is a cursor or a view.

In another aspect of the present invention, a terminal having a display function is provided comprising means for extending the display space of the terminal to another terminal, means for intercepting at the terminal an event associated with an object occurring in the terminal so as to obtain the position of the object, and means for informing the another terminal of the position of the object, where the another terminal redraws the object on the screen of the another terminal based on the received position.

With the method and the terminal of the present invention, a cursor/cursors can freely roam over the screens of two computers, and a view can be randomly drugged and moved between the screens of two computers. Thus, the efficiency of cooperation of two computers spaced by a viewing distance can be improved. The cursor on one of the two computers can control the other computer to conduct any control operation.

BRIEF DESCRIPTION OF THE DRAWINGS

The above advantages and features of the present invention will be apparent from the following detailed description taken conjunction with the drawings in which.

DETAILED DESCRIPTION OF THE PREFERRED EMBODIMENTS

Hereafter, a detailed description is given to the preferred embodiment of the present invention with reference to the figures, throughout which like elements are denoted by like reference symbols or numbers. In the following description, the details of any known function or configuration will not be repeated, otherwise they may obscure the subject of the present invention.

According to an embodiment of the present invention, two computer, computer A and computer B, are arranged in parallel. Each of the two computers A and B has a screen, a keyboard, a mouse and other components required for the normal operation of the computer, such as CPU, memory, hard disk, peripheral devices, etc. The two computers are connected via a network and spaced from each other only by a short distance so that they can be used by one person.

In the embodiment of the present invention, each of computer A and computer B is installed with a virtual extended screen drive for extending the screen, that is, extending the screen space of computer A onto computer B, and extending the screen space of computer B onto computer A at the same time. In other words, each of the computers has a virtual extended screen while serving as an extended screen for the other computer.

Figure 1:
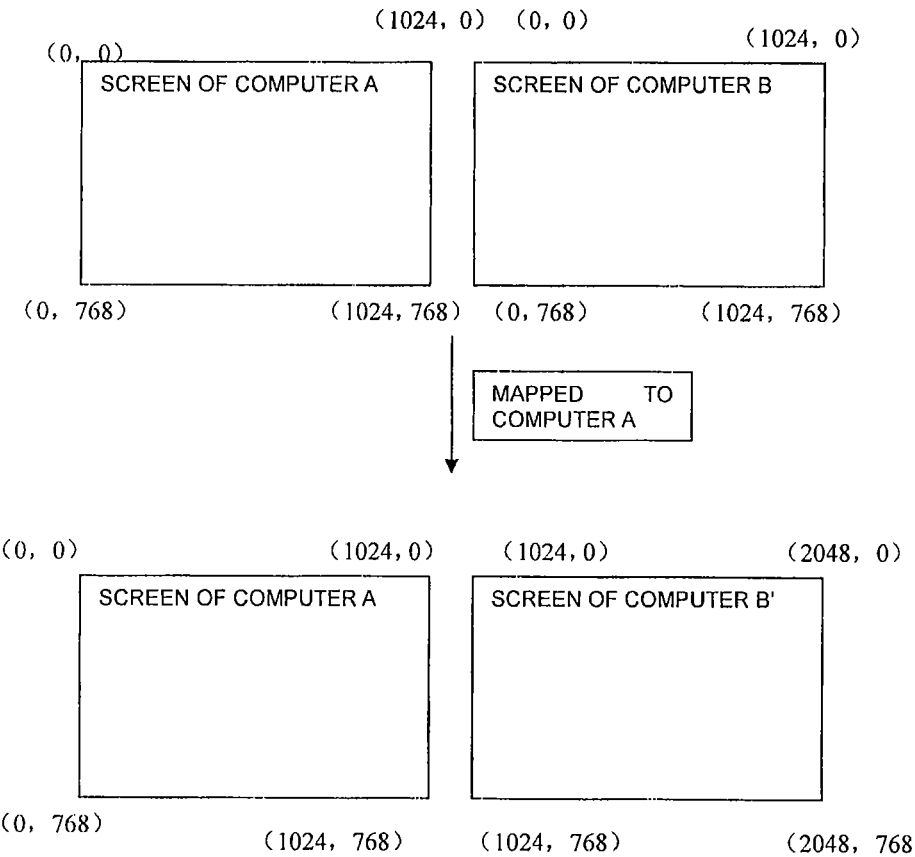
FIG. 1 is a schematic diagram showing that the display space of computer B is mapped onto computer A.

As shown in FIG. 1, computers A and B each has an independent coordinate system, and they are arranged next to each other. The coordinate system of computer B is mapped onto computer A, that is, B'=coordinate on X axis of B+1024, or B'(X, Y)=B((X+1024), Y).

Figure 2:
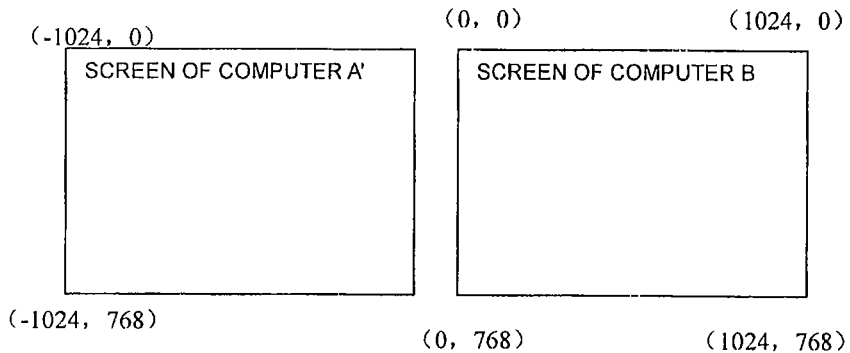
FIG. 2 is a schematic diagram showing that the display space of computer A is mapped onto computer B.

After the above mapping relation is established, coordinates of all windows on computer B can be mapped onto computer A. Accordingly, computer A can learn the coordinates on computer A for all the windows on computer B. Then, such information as displacement of the window on computer B can be transmitted to computer A. This is true in a reverse manner, that is, coordinates on computer A can be mapped onto computer B, as shown in FIG. 2.

Figure 3:
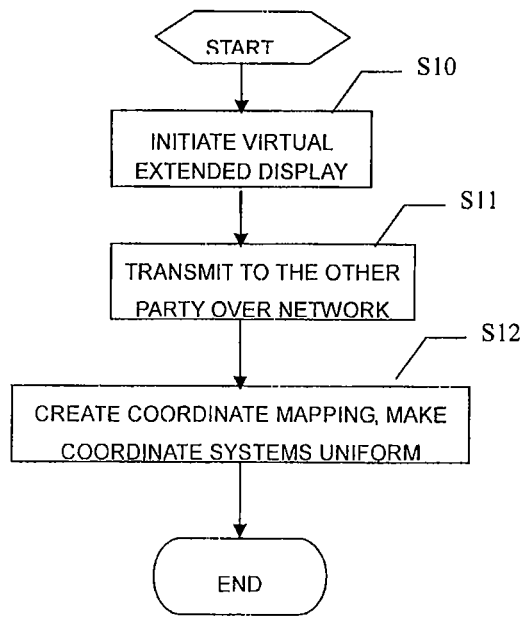
FIG. 3 is a flowchart showing a virtual display extending process by a computer.

FIG. 3 is a flowchart showing a virtual display extending process by a computer. As shown in FIG. 3, the two computers A and B each initiate a virtual display extending process at step S10, when an object, such as a cursor or the like, is to be moved between computers A and B.

At step S11, computer A and computer B transmit mutually their cursor positions or positions of view displaying over the network, after the initiation of the virtual display extending process. Next, a uniform coordinate system is established in the above manner on each of computer A and computer B at step S12. In this way, the process of mapping the cursor or the view of one computer onto the display screen of the other computer is completed.

The virtual extended screen drive functions to add a virtual extended screen to the original system. Such virtual extended screen is actually realized in such a manner that a network-based extended video card drives the screen on another computer to act as an extended screen for the host computer. To be specifically, the screen of computer A acts as the extended screen of computer B, while the screen of computer B acts as the extended screen of computer A. Regarding the conventional technique for extended screen, the display content on all the screens is handled by a single host computer. The present invention differs from the conventional technique in that all content graphics displayed on the screen of computer A are handled by computer A, while all content graphics displayed on the screen of computer B are handled by computer B, no matter which computer the displayed content comes from. Thus, content originating from computer A can be displayed on the screen of computer B, or a portion of the content can be displayed on the screen of computer A, and the other portion can be displayed on the screen of computer B. The key point is to transmit over the network the content to be displayed on the other computer to the other computer, process the content transmitted over the network by the other computer and display the content on the other computer.

Figure 4:
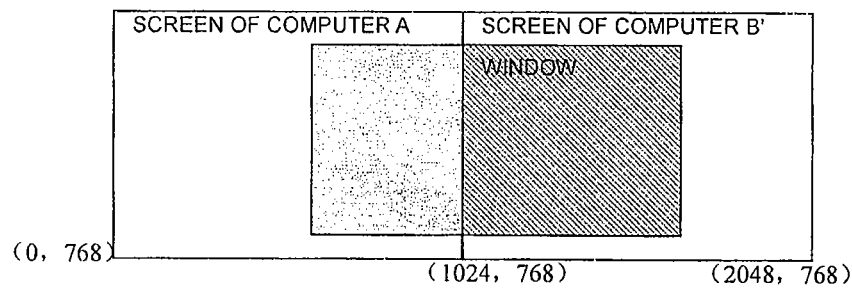
FIG. 4 shows a window operation spanning two displays, in which the hatched portion is handled by computer B, and the grey portion is handled by computer A.
Figure 5:
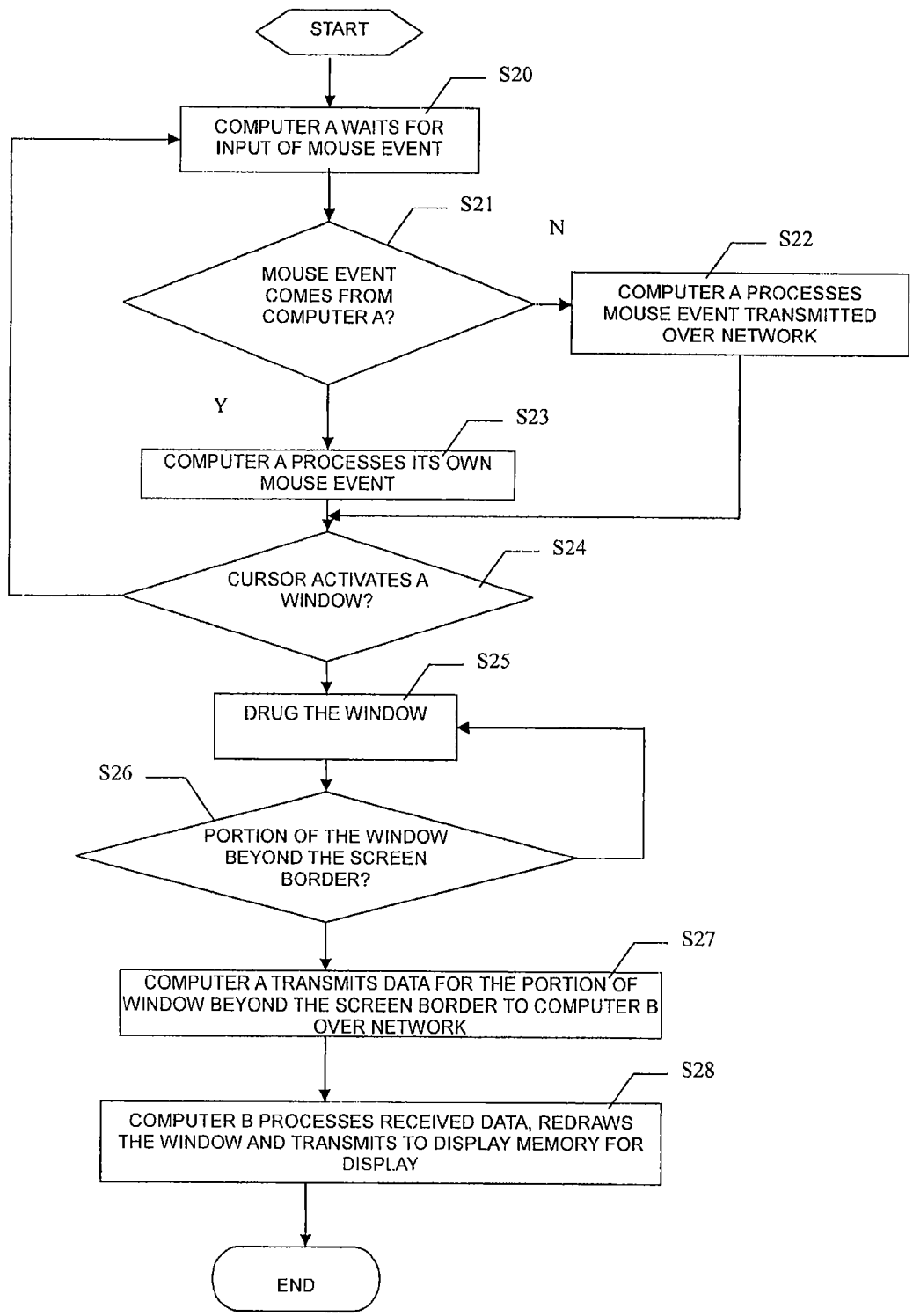
FIG. 5 is a flowchart showing the cursor of computer A roams onto the screen of computer B.

It should be noted here that what is transmitted is content data in the display memory other than only content of processes. Specifically, as shown in FIG. 4, computer A moves a portion of the window on the screen of computer A to the screen of computer B. Thus, only the content data of the hatched portion in the display memory are transmitted to computer B over the network, while the grey portion of the window remains on computer A for further processing. FIG. 5 is a flowchart showing the cursor of computer A roams onto the screen of computer B.

As shown in FIG. 5, computer A waits for the input of a mouse event, for example, at step S20. Then, computer A determines whether the mouse event comes from computer A or computer B.

If the determination result is that the mouse event is launched by the mouse of computer A, this mouse event is handled by computer A at step S23.

If the determination result is that the mouse event is launched by the mouse of computer B, computer A handles the mouse event transmitted from computer B via the network.

Next, it is determined whether the cursor has activated a window at compute A at step S24. If the window is activated, it is subjected to a drugging operation at step S25. For example, the window is drugged from the screen of computer A to the screen of computer B. If no window is activated, the flow turns to step S20, and the above process is repeated.

It is determined whether the window extends across the screen border of computer A at step S26. If the answer is YES, computer A transmits the data for the portion of the window beyond the screen border to computer B via the network at step S27. If the drugging operation does not cause the window to exceed the screen border, the flow turns to step S25 where the above process continues.

At the following step S28, computer B receives the data via the network, redraws the window and transmits it to the display memory for display. In this way, the cooperative display process of drugging the window between different computer screens is completed.

Besides, in the case of displaying a window which is extending across two systems, the portions in these systems are distinguished according to coordinate system. The portion whose coordinates on computer A is processed by computer A, while the other portion whose coordinates on computer B is processed by computer B. During the trans-system operation, only the content data for the portion beyond the border in the display memory are transmitted to the other computer.

After receiving the content in the display memory transmitted from computer A, computer B redraws the window portion on its own screen. Specifically, the content associated with the window in the display memory carries position information. The coordinates of these positions are converted according to the extended coordinates and then mapped onto computer B. After that, this information is written in the display memory of computer B through GDI or DIRECTX. In other words, the window portion is moved and redrawn on computer B.

If computer A has a display mode different from that of computer B, conversion of display mode will be made to fit the display mode of computer A or B. For example, the display modes of computers A and B can be set consistent with each other.

Figure 6:
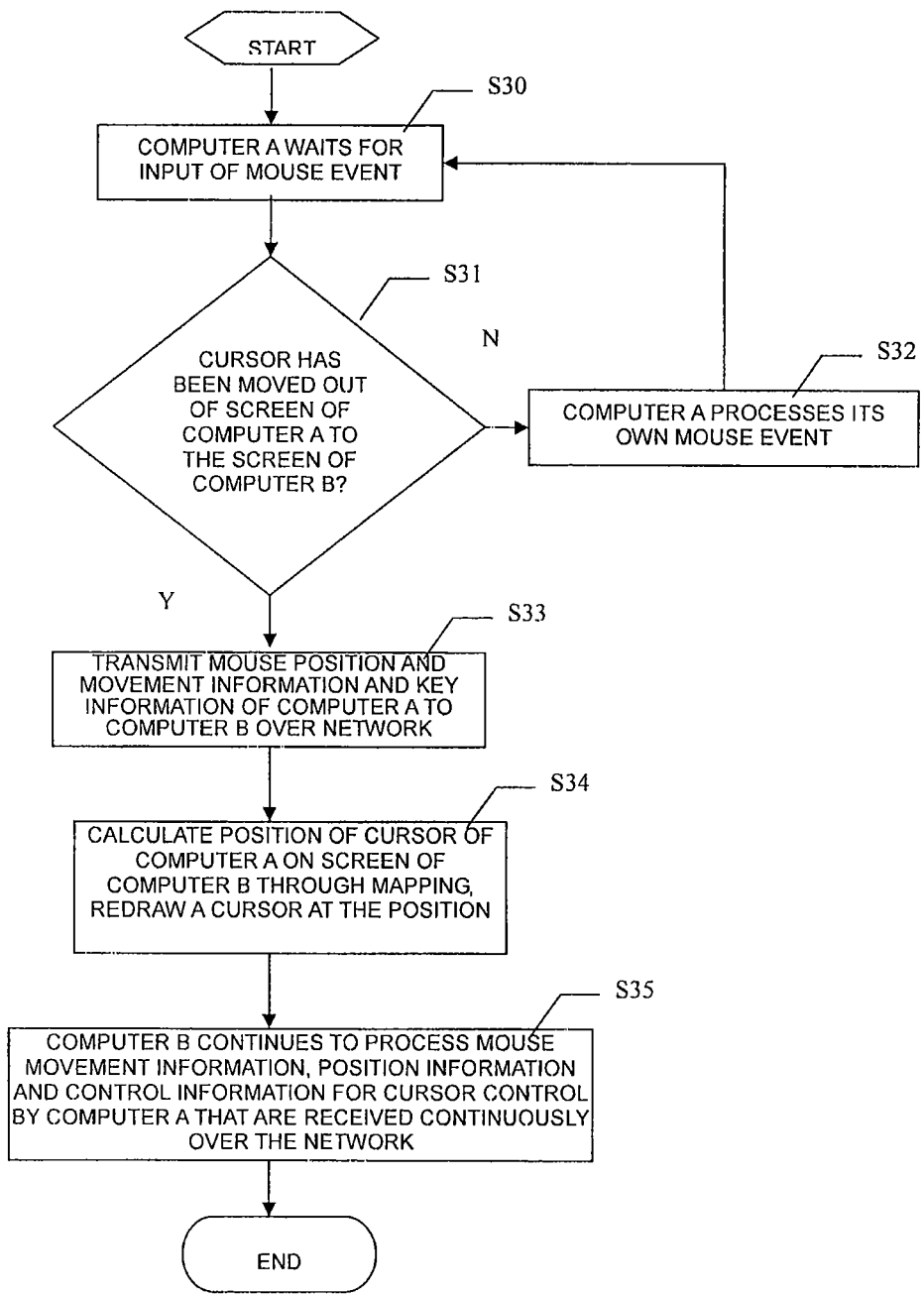
FIG. 6 is a flowchart showing the process of drugging a window on the screen of computer A onto the screen of computer B with a mouse of either one of the two computers.

FIG. 6 is a flowchart showing the process of drugging a window on the screen of computer A onto the screen of computer B with a mouse of either one of the two computers.

When the cursor on computer A is moved onto computer B, the newly-arriving cursor needs to be redrawn on computer B. The reason is that the cursor controlled by computer A appears on computer B, which has already had its own cursor.

As shown in FIG. 6, computer A waits for the input of a mouse event, for example, at step S30. Then, computer A determines whether the position of the cursor is moved from the screen of computer A onto the screen of computer B, after it receives an input mouse event.

If the determination result at step S31 is negative, computer A handles its own mouse event at step S32. Then, the flow turns to step S30, and the above process is repeated.

Next, at step S33, computer A transmits to computer B over the network the position information of the cursor on the extended coordinate system, such as coordinates, the movement information like direction as well as the key information. At step S34, computer B reversely maps the received position information onto computer B. After that, computer B redraws a cursor on its own screen, with the position, movement and key information being transmitted from computer A. Meanwhile, computer B will authorize the control right for the redrawn cursor so that the cursor can be moved on the screen of computer B under control of the mouse of computer A. At the same time, the operating system (OS) of computer A records all input acts of its mouse and transmits the record to computer B over the network. The OS of computer B calculates the movement position of the redrawn cursor based on the received movement information of the mouse of computer A, outputs the calculation result to the display memory of computer B, and controls the window on computer B based on the information on mouse/key click of computer A received over the network. At step S35, computer B continues to process mouse movement information, position information and control information for cursor control by computer A that are received continuously over the network. As such, the cursor of computer A can smoothly roam onto the screen of computer B and enable operation of the window on computer A.

Thus, after the two computers are networked and provides virtual extended display to each other, two cursors emerges with each of them being controlled by the mouse of the corresponding computer. The mouse of computer A controls the cursor of computer A, and the mouse of computer B controls the cursor of computer B. Meanwhile, each of the two cursors can be freely moved on any of the screens under the control of the corresponding computer. Thus, the user can control the two computers by operating the mouse of one of the computers. Also, the operation of text input on computer B can be fulfilled with the keyboard of computer A. For example, the cursor can be moved to computer B, and a new file is built on computer B with the mouse of computer A. Then, the window of the file is drugged onto computer A for further input operation. Also, the input operation can be conducted on the screen of computer B.

According to the embodiment of the present invention, the physical space position information of the two computers needs to be adjusted as consistent with that in their drives. The adjustment can be implemented by the existing position adjustment techniques for real extended screen, such as the adjustment for real extended screen in Microsoft Windows XP operating system.

Although the above description is give to the case that two computers are arranged in parallel in a horizontal direction, the two computers can also be arranged in a vertical direction. In this case, the display space of the computers is extended vertically.

It contributes a lot to the improvement in operating efficiency, since a cursor/cursors can freely move between the screens of two computer systems spaced by a short viewing distance. For example, considering the scenario where users A and B are discussing while facing computers A and B along the same direction. If user A wants to view a window on computer B, user B can use his mouse to directly drug the window from the screen of computer B to the screen of computer A so that user A can view the window, instead of copying the overall file to computer A and opening the file on computer A for viewing by user A.

Figure 7:
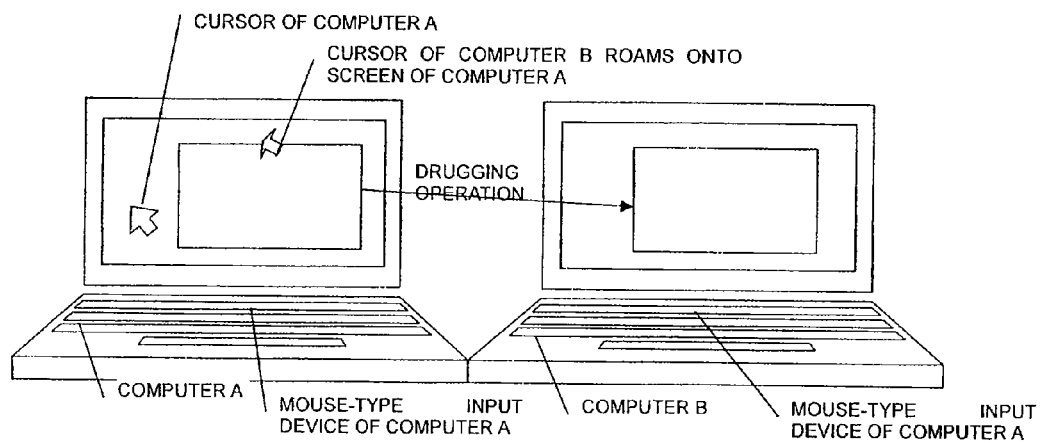
FIG. 7 shows an application of the method of the present invention.

FIG. 7 shows an application of the method of the present invention, in which two computers are connected via a wireless network. When the two computers are in use simultaneously, a window can be drugged easily between the two screens of the computers by operating the input device, such as keyboard, mouse and the like, of either one of the computers. For a notebook computer, the input device is generally of mouse type, such as touch panel, touch stick, or it can be a mouse. As shown in FIG. 7, the user operates the mouse on computer B and causes the cursor to roam onto the screen of computer A. Then, through a drugging operation with the mouse, the user drugs a window belonging to computer A onto the screen of computer B for display. In addition, characters can be entered from a keyboard to the drugged window upon the activation of the window. The entered characters are displayed on the drugged window. After the cursor of computer B has roamed onto the screen of computer A, the window on the screen of computer A can be activated with the mouse and keyboard of computer B. Further, characters can be entered to the window with the keyboard of computer B.

Figure 8:
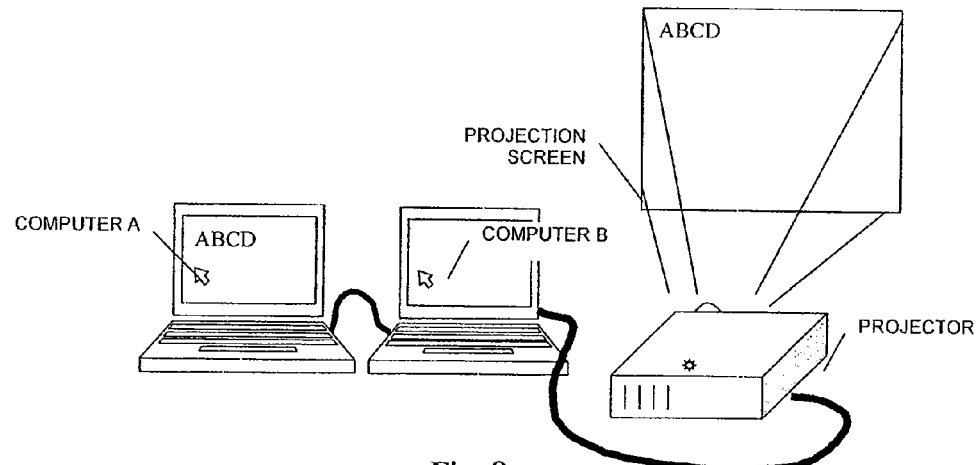
FIG. 8 shows a further application of the method of the present invention.

FIG. 8 shows another application of the method of the present invention, in which computers A and B are each connected to a network, and computer B is connected to a projector. With the roaming method of the present invention, a window on computer A can be directly drugged onto the projector by operating the mouse of computer A. The relationship between computer B and the projector can be that of duplicated screen or real extended screen.

With the above method, a cursor/cursors can be freely moved on the screens of two networked computers. Further, operations like window drugging and separate inputting can be performed between the two screens.

Further, the two networked computer can be respectively configured so that one of them first issues an invitation for drive activation, the other one accepts the invitation. As such, the activation is fulfilled. Also, the accepting act can be effected by pressing certain switch to activate and close the drive for the above virtual extended screen over the network. When the virtual network extended display drive is closed, conventional condition and control state are resumed, with all the windows and cursors roaming on the other computer returning to the screen of the computer for home control. For example, if a window or a cursor of computer A has roamed onto the screen of computer B, it will return automatically to the screen of computer for display after the virtual extended display drive is closed. Acts like closing a real extended display can be performed by closing the mutual mapping relation.

Similarly, the principle of networking two computers and implementing virtual extended display can be applied to the case that more than two computers are networked to conduct extended display together. Thus, the above method is seamlessly applicable to the virtual extended display among a plurality of networked computers.

[Variations]

Figure 9:
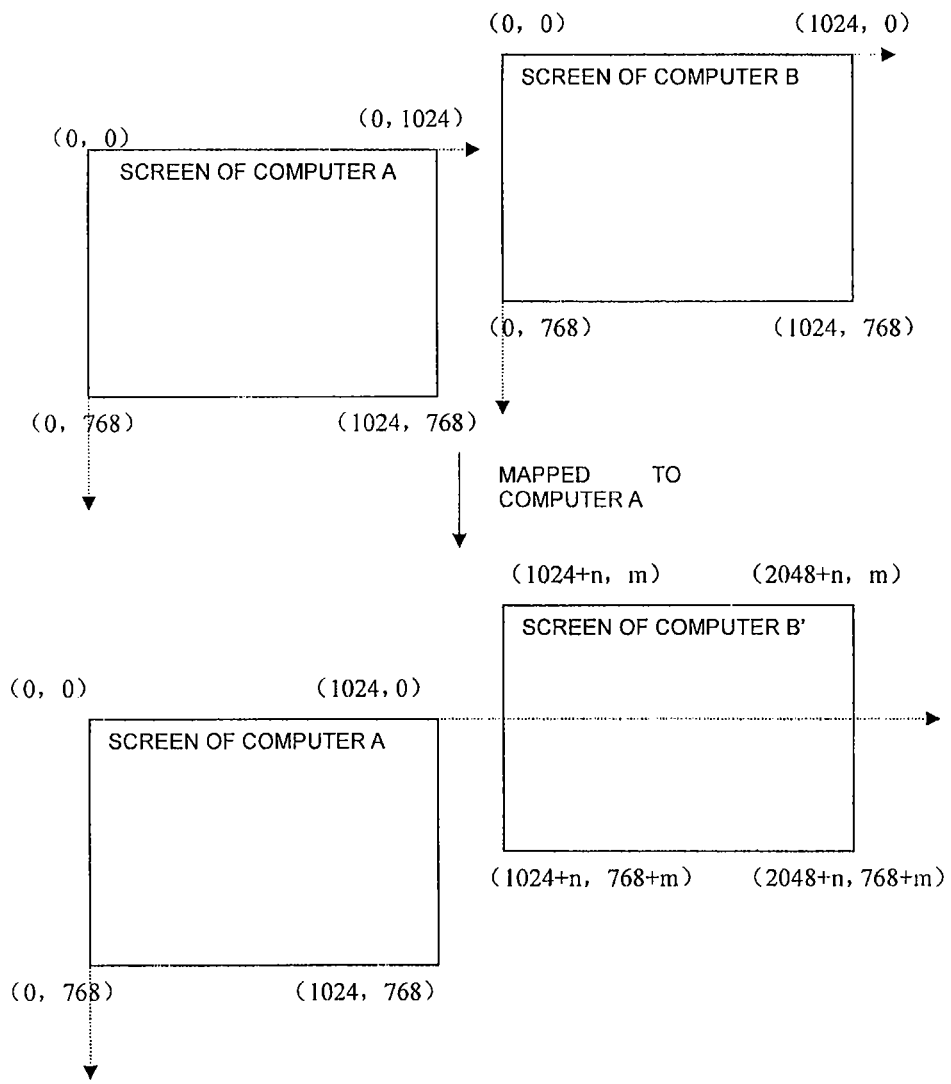
FIG. 9 shows a schematic diagram of display space mapping in an arbitrary direction.

Although the embodiment of the present invention is explained with the horizontal and vertical directions as example, the display space can be mapped in any other direction. FIG. 9 shows a schematic diagram of display space mapping in an arbitrary direction.

As shown in FIG. 9, n and m are offsets, and n=100, m=−260. The mapping relationship can be induced as the coordinates (X, Y) of a point on computer B being mapped to the coordinates (X+1024+100, Y−260) on computer A.

Figure 10:
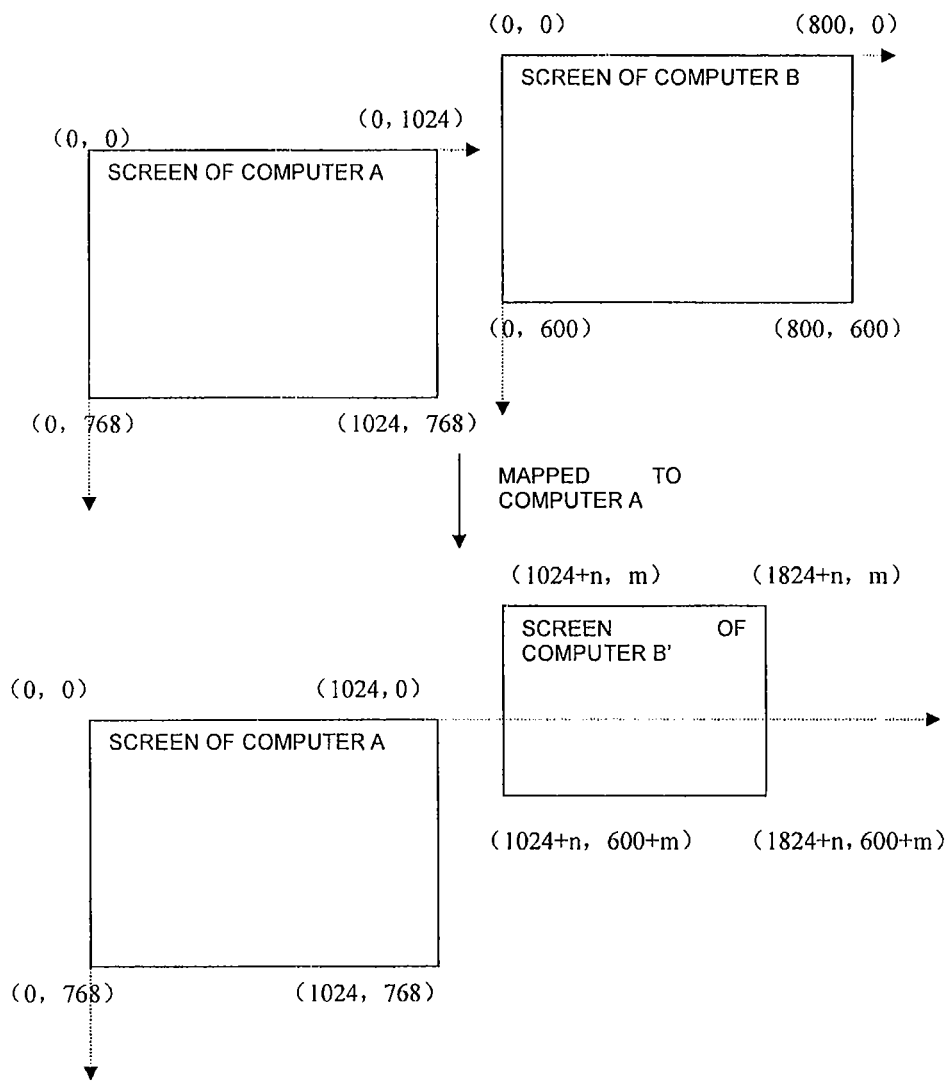
FIG. 10 is a schematic diagram showing display space mapping between two computers having different resolutions.

Further, display space mapping can be implemented between computers A and B even when they have different resolutions. FIG. 10 is a schematic diagram showing display space mapping between two computers having different resolutions.

As shown in FIG. 10, the screen of computer B is of the same size as computer A while having a much lower resolution configuration. A real mapping is performed according to pixels of a real resolution. Thus, in terms of pixels, the screen of computer B becomes smaller in the mapped virtual coordinate space, assuming that all the pixels are of the same size. In practice, the real pixels of computer B each have a larger size than that of computer A.

As described above, the method according to the present embodiment addresses the issue of unifying display space between two computers connected via some network. By using a method similar to screen extension within a single system, the present invention maps the independent coordinate system of one of the two computer onto the other, so that the display space of the two computer can be extended to each other. One of the computers can intercept the mouse/keyboard event occurring in each computer and inform the other computer of the event. The other computer in turn tracks the position of a cursor, and handles the event locally if the cursor is on the other computer. The other computer also processes the event if it is transmitted over the network.

The foregoing description is only the embodiment of the present invention. Those ordinarily skilled in the art will appreciate that any modification or substitution in the principle of the present invention shall fall into the scope of the present invention defined by the appended claims.

What is claimed is:

1. A method of operating an object between a first terminal and a second terminal, wherein the first terminal and the second terminal are provided with respective input devices and displays, the method comprising:
   extending the display space of the first terminal to the second terminal and the display space of the second terminal to the first terminal;
   intercepting at the first terminal an event associated with a cursor occurring in the first terminal so as to obtain the position of the cursor;
   informing the second terminal of the position information and movement information of the cursor and input information such that the second terminal redraws the cursor on the screen of the second terminal using the received position information when the position of the cursor indicates that the cursor needs to be displayed on the screen of the second terminal;
   authorizing, by the second terminal, the control right for the redrawn cursor so that the cursor can be moved on the screen of the display of the second terminal; and
   calculating, at the second terminal, the movement position of the redrawn cursor based on the movement information received from the first terminal, and controlling an object on the display of the second terminal based on the input information received from the first terminal.

2. The method of claim 1, wherein said extending comprising mapping the coordinate system of the first terminal or the second terminal to the coordinate system of the second terminal or the first terminal in an arbitrary direction.

3. The method according to claim 1, wherein the display modes/mode of the first terminal and/or the second terminal are/is converted so that the display modes of the first and second terminals are identical.

4. The method according to claim 1, wherein redrawing the cursor comprises placing information on the cursor in a display memory of the second terminal or the first terminal through GDI or DIRECTX.

5. The method according to claim 1, wherein the first and second terminals are connected by a network and transmit data over the network.

6. The method according to claim 5, wherein said network comprises a wired network or a wireless network.

7. A system of operating an object between a first terminal and a second terminal, the first terminal, wherein the first terminal and the second terminal each is provided with an input device and a display, the first terminal comprising:

means for extending the display space of the first terminal to the second terminal;

means for intercepting at the first terminal an event associated with a cursor occurring in the first terminal so as to obtain the position of the cursor;

means for informing the second terminal of the position information of the cursor such that the second terminal redraws the cursor on the screen of the second terminal using the received position information when the position of the cursor indicates that the cursor needs to be displayed on the screen of the second terminal;

means for authorizing, by the second terminal, the control right for the cursor so that the cursor can be moved on the screen of the display of the second terminal; and means for calculating, at the second terminal, the movement position of the redrawn cursor based on the movement information received from the first terminal, and controlling an object on the display of the second terminal based on the input information received from the first terminal;

the second terminal comprising:

means for extending the display space of the second terminal to the first terminal;

means for intercepting at the second terminal an event associated with cursor occurring in the second terminal so as to obtain the position of the cursor;

means for informing the first terminal of the position information of the cursor such that the first terminal redraws the cursor on the screen of the first terminal using the received position information when the position of the cursor indicates that the cursor needs to be displayed on the screen of the first terminal;

means for authorizing, by the first terminal, the control right for the redrawn cursor so that the cursor can be moved on the screen of the display of the first terminal; and means for calculating, at the first terminal, the movement position of the redrawn cursor based on the movement information received from the second terminal, and controlling an object on the display of the first terminal based on the input information received from the second terminal.

8. The system according to claim 7, wherein the means for extending the display space of the first terminal to the second terminal comprise:

means for mapping the coordinate system of the first terminal to the coordinate system of the second terminal in arbitrary direction; and the means for extending the display space of the second terminal to the first terminal comprise means for mapping the coordinate system of the second terminal to the coordinate system of the first terminal in arbitrary direction.

9. The system according to claim 7, wherein the first terminal is connected to the second terminal over a network.

10. The system according to claim 9, wherein said network comprises a wired network or a wireless network.

* * * * *